US006232672B1

(12) United States Patent
Leufen et al.

(10) Patent No.: US 6,232,672 B1
(45) Date of Patent: May 15, 2001

(54) HAND-HELD WORK TOOL WITH A GENERATOR

(75) Inventors: Heinrich Leufen, Winnenden; Rolf Walter, Waiblingen, both of (DE)

(73) Assignee: Firma Andreas Stihl AG & Co. (DE)

( * ) Notice: Subject to any disclaimer, the term of this patent is extended or adjusted under 35 U.S.C. 154(b) by 0 days.

(21) Appl. No.: 09/439,704

(22) Filed: Nov. 12, 1999

(30) Foreign Application Priority Data

Nov. 12, 1998 (DE) ............................................ 198 52 180

(51) Int. Cl.[7] ................................ H02P 9/10; H02K 3/00
(52) U.S. Cl. ................................ 290/1 A; 322/46; 123/3
(58) Field of Search .......................... 123/2, 3; 290/1 R, 290/1 A, 6; 322/1, 46, 59, 62, 63, 89, 90; 310/152, 154

(56) References Cited

U.S. PATENT DOCUMENTS

| | | | | |
|---|---|---|---|---|
| 4,286,675 | * | 9/1981 | Tuggle | 173/163 |
| 5,705,917 | * | 1/1998 | Scott et al. | 322/46 |
| 6,034,511 | * | 3/2000 | Scott et al. | 322/46 |
| 6,118,186 | * | 9/2000 | Scott et al. | 290/40 B |

* cited by examiner

*Primary Examiner*—Nicholas Ponomarenko
(74) *Attorney, Agent, or Firm*—Robert W. Becker & Associates

(57) ABSTRACT

A hand-held work tool has a housing with a carburetor heater and a grip heater. An internal combustion engine is mounted in the housing and has a crankshaft and an ignition system. The ignition system has a pole wheel with permanent magnets fastened sequentially at a periphery of the pole wheel in the circumferential direction. Charge armatures are mounted in the housing and close the magnetic circuit between neighboring permanent magnets. The charge armatures have legs and excitation coils mounted on the legs. Upon rotation of the pole wheel, the permanent magnets generate an electric current in the excitation coils, wherein a first set of excitation coils is combined to a first partial generator and connected to an electric circuit of the carburetor heater and a second set of the excitation coils is combined to a second partial generator and connected to an electric circuit of the grip heater such that the electric current is supplied respectively to the carburetor heater and the grip heater. The excitation coils of the first set are arranged in a row adjacent to one another in the circumferential direction. The excitation coils of the second set are arranged in a row adjacent to one another in the circumferential direction.

10 Claims, 3 Drawing Sheets

HAND-HELD WORK TOOL WITH A GENERATOR

BACKGROUND OF THE INVENTION

The present invention relates to a hand-guided work tool, especially a motor chainsaw, a cut-off saw, etc., comprising an internal combustion engine with an ignition system which comprises a pole wheel mounted on the crankshaft of the internal combustion engine and having permanent magnets positioned about the periphery in a sequential arrangement. The ignition system further comprises a plurality of charge armatures connected to the housing which close a magnetic circuit between the poles of the permanent magnets. The legs of the charge armatures support excitation coils and the permanent magnets of the pole wheel induce in the excitation coils of the charge armatures an electrical current which is supplied to the carburetor heater and a grip heater of the work tool.

The electrical energy for the ignition system of the internal combustion engine of motor chainsaws is, in general, generated by a pole wheel revolving with the crankshaft and having permanent magnets arranged in the circumferential direction in a row after one another that generate an electrical current in the excitation coils of charge armatures connected to the housing. The excitation coils are connected in series and together supply, among other consumers, a grip heater and a carburetor heater of the motor chainsaw in order to allow use of the chainsaw at low temperatures. The available power output of the generator is thus divided to the grip and to the carburetor depending on the resistance ratios of the respective heat coils. When only one of the two heaters is in use, it is supplied with a very high power output which for carburetor heaters can result in excessive temperatures and thus in fuel vapor bubble formation within the carburetor. When the windings of the excitation coil are adjusted to achieve a certain heating output for the carburetor, an insufficient total output is provided when the carburetor heater and the grip heater are operated simultaneously so that especially the grip heater will not operate satisfactorily, i.e. the temperature achieved is then too low. When adjusting the output by using different load resistors, negative effects in the heating circuits will occur during operation because of the electrical coupling in the coil resistors of the generator and the magnetic coupling in the magnetic circuit.

The invention has the object to improve a hand-held portable work tool with an internal combustion engine such that the carburetor heater and the grip heater can be supplied with respectively adjusted electrical energy.

SUMMARY OF THE INVENTION

The hand-held work tool of the present invention has a housing having a carburetor heater and a grip heater. An internal combustion engine is mounted in the housing and has a crankshaft and an ignition system. The ignition system has a pole wheel comprising permanent magnets fastened sequentially at the periphery of the pole wheel in the circumferential direction. Charge armatures are mounted in the housing for closing a magnetic circuit between neighboring ones of the permanent magnets. The charge armatures have legs and excitation coils mounted on the legs. Upon rotation of the pole wheel, the permanent magnets generate an electric current in the excitation coils. A first set of excitation coils is combined to a first partial generator and connected to an electric circuit of the carburetor heater and a second set of excitation coils is combined to a second partial generator and connected to the electric circuit of the grip heater such that the generated electric current is supplied to the carburetor heater and the grip heater, respectively. The excitation coils of the first set are arranged in a row adjacent to one another in the circumferential direction and the excitation coils of the second set are arranged in a row adjacent to one another in the circumferential direction.

By separating the generator windings into individual, electrically separated groups of excitation coils, an adaptation to the respective heating device with an optimal operating point is possible. The electrical separation into individual excitation coils and their selective combination into sets of excitation coils, which in the circumferential direction of the pole wheel are arranged in a row adjacent to one another, has furthermore the effect that a voltage drop caused by field weakness as a result of a load current has only a minimal effect on the other set of excitation coils. The coupling by a common coil resistor of the generator coil is thus eliminated.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1–5.

Figure 1:
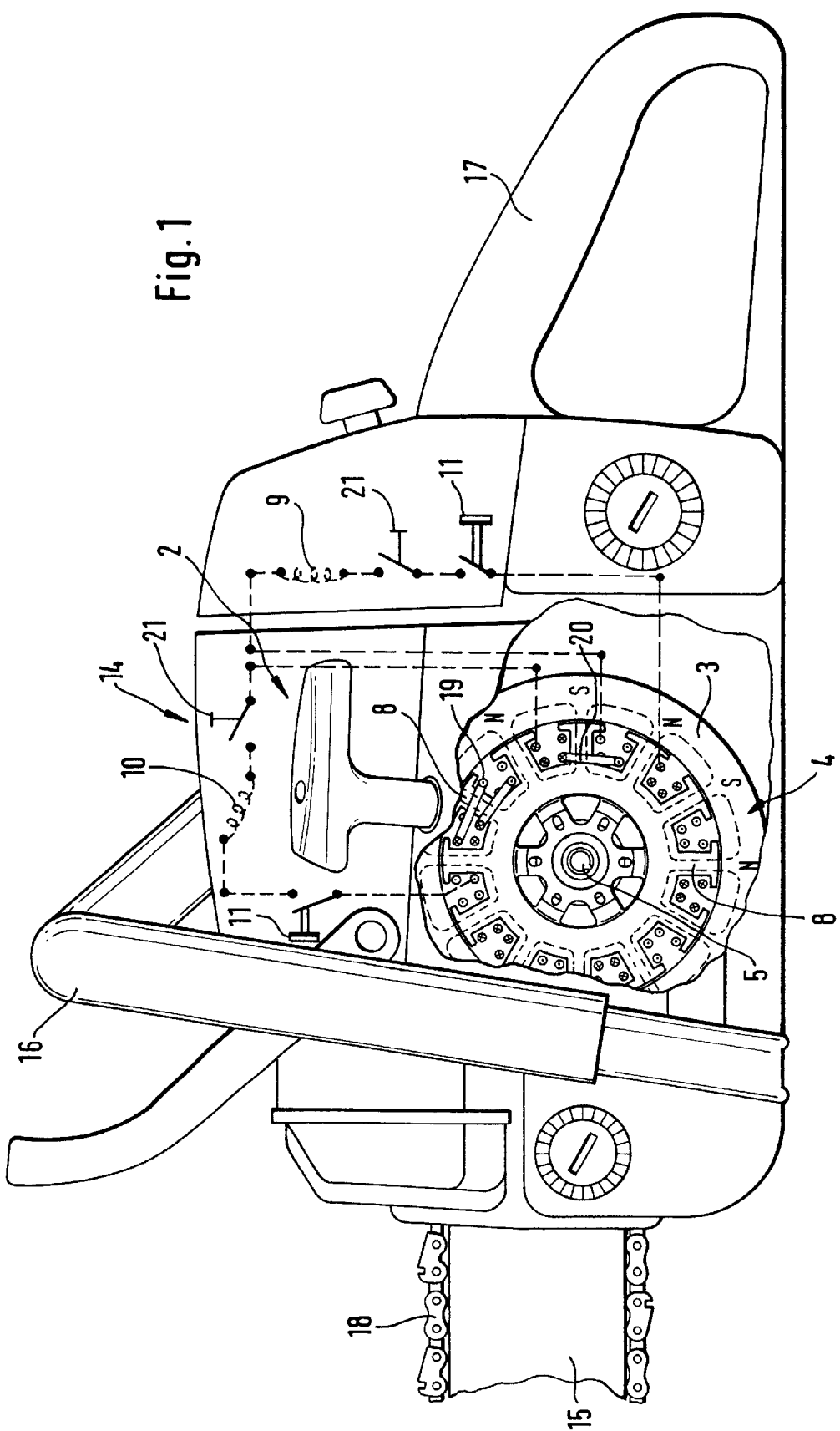
FIG. 1 is a side view of a motor chainsaw with an internal combustion engine and partially removed vent cover.

FIG. 1 shows a motor chainsaw having an internal combustion engine with ignition system as a drive motor. The motor chainsaw 14 has a guide bar 15 with circulating saw chain 18 and is guided by the operator with the aid of two grips 16 and 17. The saw chain 18 is driven by a chain sprocket via the crankshaft 5 and a non-represented clutch device. At the other end of the crankshaft 5 a fan wheel embodied as a pole wheel 3 is secured which rotates together with the crankshaft. Permanent magnets 4 are arranged on the pole wheel 3 and uniformly spaced in the circumferential direction. In the shown embodiment six permanent magnets are provided, i.e., twelve magnetic poles N, S are formed. At the housing charge armatures are provided so as to surround the pole wheel 3. They close the magnetic circuit K (indicated by dashed lines) between two neighboring poles N, S of the permanent magnets. The charge armatures have legs 8 with at least one excitation coil 6.1 through 6.12 The charge armatures, each comprised of two legs 8, are uniformly distributed in the circumferential direction of the pole wheel 3. In the shown embodiment, six charge armatures each having two legs 8 are provided, i.e., twelve magnetic circuits K are formed. When the pole wheel 3 revolves, the permanent magnets 4 alternatingly close the magnetic circuits K when passing the legs 8 of the charge armatures so that voltage is induced in the excitation coils 6.1 through 6.12 by the change of the magnetic flux. Individual excitation coils 6.1, 6.2, 6.3 or 6.4, 6.5 can be serially connected by coupling members 20, e.g., wire connections (bridges), and form partial generators. Depending on the number of connected excitation coils 6.1 to 6.12 within in a set G1, G2, different voltages for the different consumers (heaters) 9, 10 can be provided.

The pole wheel 3 is comprised of magnetically non-conducting material so that the degree of magnetic decoupling can be controlled as a function of the selected connection of the individual excitation coils 6.1 through 6.12. In the shown embodiment, six charge armatures with twelve excitation coils 6.1 through 6.12 are provided and some of the excitation coils 6.1 through 6.12 are combined to two sets forming separate and independent partial generators. It may be expedient to create three or more independent partial generators. The excitation coils 6.1, 6.2, 6.3 of the set G2 of the first partial generator, when viewed in the circumferential direction of the pole wheel 3, are arranged in a row after one another behind the excitation coils 6.4 and 6.5 of the second partial generator. With this spacial separation, respectively, spacing, the two sets G1 and G2 are substantially magnetically decoupled. Only the neighboring excitation coils 6.3 and 6.4 of adjacent sets G1, G2 are slightly magnetically coupled by minimal magnetic leakage.

By selecting the number of excitation coils 6.1 through 6.12 combined to the respective independent partial generator, for example, for use with a grip heater 10 or a carburetor heater 9 as a consumer, the individual heating devices can be individually optimized without having to vary the number of core windings or the diameter of the core wire 19. The two heating devices 9, 10 can be switched on and off independent of one another by the switches 21. The thermal switches 11, which are, e.g., a bi-metal switch, prevent overheating of the respective heater 9 or 10.

Figure 2:
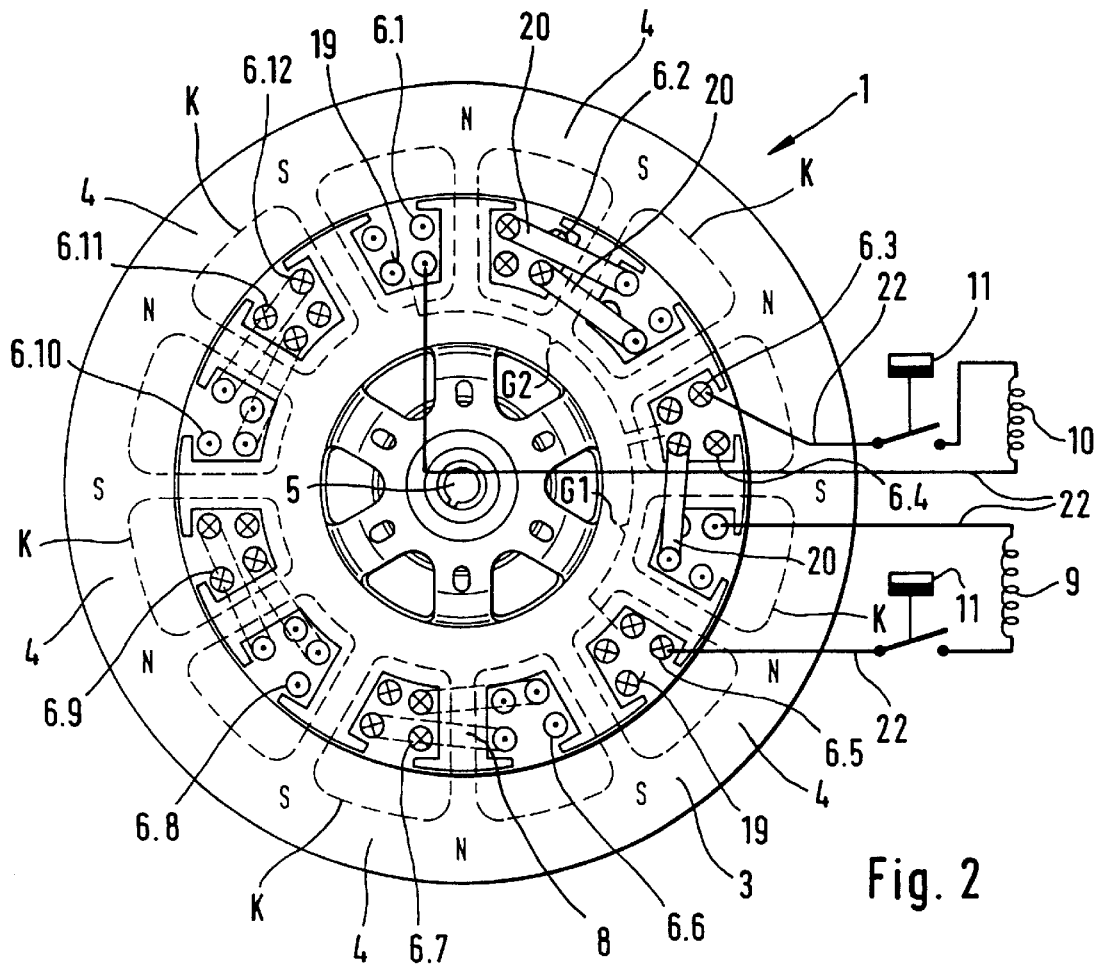
FIG. 2 shows an enlarged view of the generator integrated in the fan wheel and having generator coils separated from one another and respectively connected to the carburetor heater and the grip heater, respectively.

FIG. 2 shows a view of the inventive two-part generator 1, having two consumers, i.e., a carburetor heater 9 and a grip heater 10, connected to the two partial generators. Six permanent magnets 4 are arranged in the circumferential direction on the pole wheel 3, which because of the magnetic non-conducting material of the pole wheel 3, are substantially magnetically decoupled. At the non-represented housing of the internal combustion engine 2 six charge armatures with twelve legs 8 are arranged so as to be surrounded by the pole wheel 3. The excitation coils 6.1 through 6.12 arranged on the legs 8 are connected in series to form three partial generators. When the pole wheel 3 and the permanent magnets 4 revolve together with the crankshaft 5, voltage is produced in the excitation coils 6.1 to 6.12 mounted on the legs 8 of the charge armatures by the changing magnetic flux. The voltage of the serially connected excitation coils 6.4, 6.5 is supplied to the carburetor heater 9 and the voltage of the excitation coils 6.1, 6.2, 6.3 is supplied to the grip heater 10 via electrical lines 22 (electrical circuit). As a temperature control for the heaters 9 or 10, a thermal switch 11 is provided in the electrical heating circuit so as to prevent overheating of the heating devices 9, 10.

Figure 3:
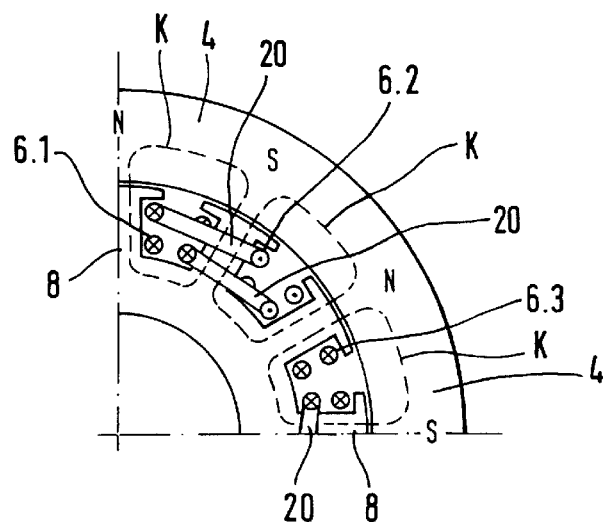
FIG. 3 shows a segment of the generator according to FIG. 2.

FIG. 3 illustrates that upon rotation of the pole wheel 3 relative to the represented excitation coils 6.1, 6.2, and 6.3, the coils 6.1–6.3 are magnetically coupled to one another by a load current in the coils 6.1–6.3. When the sets G1 and G2 of the excitation coils are serially connected to form partial generators, only the first or last excitation coils positioned in the circumferential direction are magnetically slightly coupled with one another by a load current, while the other excitation coils 6.1, 6.2 are completely decoupled from the load current of the set G1.

Figure 4:
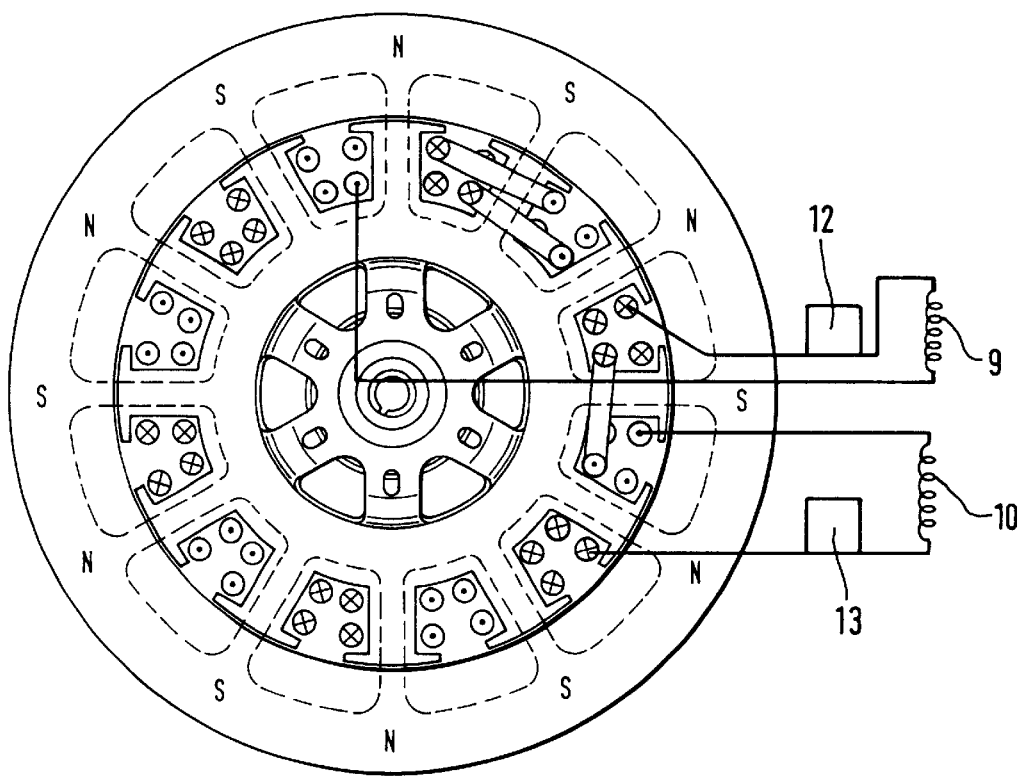
FIG. 4 is a view of the generator according to FIG. 2 with a PTC resistor and/or semiconductor arranged in the respective heating circuit.

FIG. 4 shows a view of the inventive generator for an internal combustion engine as illustrated in FIG. 2 but provided with a PTC (positive temperature coefficient) resistor 12 while the grip heater 10 is provided with a semiconductor 13 as a protection against overheating. The semiconductor 13 is preferably a component of an electronic control.

Figure 5:
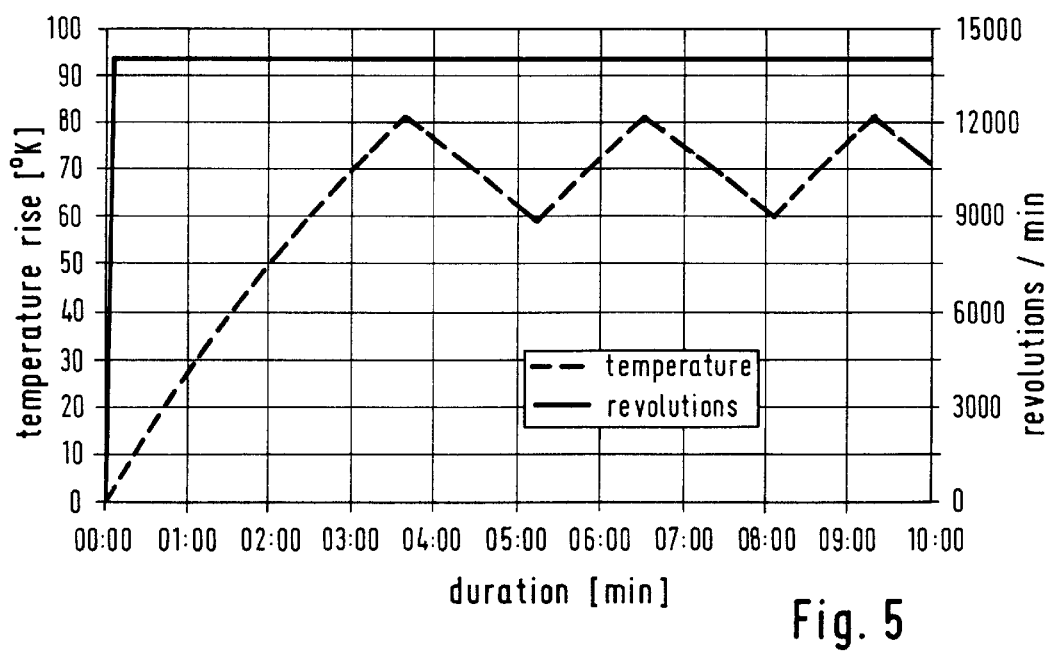
FIG. 5 is a diagram of the temperature curve of a heating system operated with the inventive generator.

FIG. 5 shows a diagram of the temperature curve of the heater 9 as a function of the rpm of the internal combustion engine 2. The temperature is controlled either by a thermal switch, a PTC resistor, or a semiconductor component.

In FIG. 2 a third partial generator is shown in addition to the partial generator comprised of the set G2 with excitation coils 6.4 and 6.5 and the set G1 with excitation coils 6.1, 6.2, 6.3. This third partial generator is comprised of the excitation coils 6.6 through 6.12 and can be used to supply the ignition system with current. The wire 19 is connected serially via coupling members shown in dashed lines.

The inventive generator is suitable for use in work tools of different kinds, for example, in cut-off saws, hedge trimmers, trimmers, etc. A heater supplied with energy by the generator can be controlled, depending on the requirements, by a PTC resistor, a thermal switch, or an electronic control.

The specification incorporates by reference the disclosure of German priority document 198 52 180.4 of Nov. 12, 1998.

The present invention is, of course, in no way restricted to the specific disclosure of the specification and drawings, but also encompasses any modifications within the scope of the appended claims.

What is claimed is:

1. A hand-held work tool comprising:

a housing having a carburetor heater (9) and a grip heater (10);

an internal combustion engine (2) mounted in said housing;

said internal combustion engine (2) having a crankshaft (5) and an ignition system;

said ignition system having a pole wheel (3) mounted on said crankshaft (5) so as to rotate with said crankshaft (5);

said pole wheel (3) having permanent magnets (4) fastened sequentially at a periphery of said pole wheel (3) in a circumferential direction;

charge armatures mounted in said housing;

said charge armatures closing a magnetic circuit between neighboring ones of said permanent magnets (4);

said charge armatures having legs (8) and excitation coils (6.1–6.12) mounted on said legs (8), wherein a first set (G1) of said excitation coils (6.4–6.5) is combined to a first partial generator and wherein a second set (G2) of said excitation coils (6.1–6.3) is combined to a second partial generator, wherein said first set and said second set are electrically separated from one another;

wherein said first partial generator is connected to an electric circuit of said carburetor heater (9) and wherein said second partial generator is connected to an electric circuit of said grip heater (10);

said permanent magnets (4), when rotating with said crankshaft (5), generating an electric current in said excitation coils (6.1–6.12) of said first and second partial generators, wherein said first partial generator supplies the electric current to said carburetor heater (9)

and said second partial generator supplies the electric current to said grip heater (10);

said excitation coils (6.4–6.5) of said first set (G1) arranged in a row adjacent to one another in said circumferential direction;

said excitation coils (6.1–6.3) of said second set (G2) arranged in a row adjacent to one another in said circumferential direction.

2. A work tool according to claim 1, wherein each one of said legs (8) of said charge armatures has at least one excitation coil (6.1–6.12).

3. A work tool according to claim 2, wherein all of said excitation coils (6.1–6.12) have an identical number of coil windings and an identical coil wire diameter.

4. A work tool according to claim 2, wherein said pole wheel (3) has at least four of said permanent magnets (4) cooperating with four of said charge armatures each having two legs (8).

5. A work tool according to claim 1, wherein said electric circuit of said carburetor heater (9) comprises a thermoswitch (11) for protecting said carburetor heater (9) against overheating.

6. A work tool according to claim 5, wherein said thermoswitch (11) is a bi-metal switch.

7. A work tool according to claim 1, wherein said electric circuit of said grip heater (10) comprises a thermoswitch (11) for protecting said grip heater (10) against overheating.

8. A work tool according to claim 7, wherein said thermoswitch (11) is a bi-metal switch.

9. A work tool according to claim 1, wherein said electric circuit of said carburetor heater (9) comprises a PTC resistor or a semiconductor for protecting said carburetor heater (9) against overheating.

10. A work tool according to claim 1, wherein said electric circuit of said grip heater (10) comprises a PTC resistor or a semiconductor for protecting said grip heater (10) against overheating.

\* \* \* \* \*